US009766681B2

(12) United States Patent
Solihin et al.

(10) Patent No.: US 9,766,681 B2
(45) Date of Patent: Sep. 19, 2017

(54) OPERATIONS RELATED TO A RETRANSMISSION BUFFER

(71) Applicant: EMPIRE TECHNOLOGY DEVELOPMENT LLC, Wilmington, DE (US)

(72) Inventors: Yan Solihin, Raleigh, NC (US); Ahmad Samih, Austin, TX (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 250 days.

(21) Appl. No.: 14/306,406

(22) Filed: Jun. 17, 2014

(65) Prior Publication Data

US 2015/0362975 A1 Dec. 17, 2015

(51) Int. Cl.
| H04L 12/28 | (2006.01) |
| G06F 1/32 | (2006.01) |
| H04W 52/48 | (2009.01) |
| H04W 40/10 | (2009.01) |
| H04W 40/12 | (2009.01) |
| H04L 12/721 | (2013.01) |

(52) U.S. Cl.
CPC .......... *G06F 1/3206* (2013.01); *G06F 1/324* (2013.01); *G06F 1/3278* (2013.01); *G06F 1/3296* (2013.01); *H04W 52/48* (2013.01); *H04L 45/123* (2013.01); *H04W 40/10* (2013.01); *H04W 40/125* (2013.01); *Y02B 60/126* (2013.01); *Y02B 60/1217* (2013.01); *Y02B 60/1285* (2013.01); *Y02B 60/50* (2013.01)

(58) Field of Classification Search
CPC .................................................... H04W 52/48
See application file for complete search history.

(56) References Cited

U.S. PATENT DOCUMENTS

| 7,552,304 B2 * | 6/2009 | Marchal ................ G06F 8/4432 711/170 |
| 2002/0120727 A1 * | 8/2002 | Curley .................... H04L 41/12 709/223 |

(Continued)

OTHER PUBLICATIONS

Michael A. Bajura et al., "Models and Algorithmic Limits for an ECC-Based Approach to Hardening Sub-100-SRAMs," IEEE Transactions on Nuclear Science, Aug. 2007, pp. 935-945, vol. 54, No. 4.

(Continued)

*Primary Examiner* — Omar Ghowrwal
*Assistant Examiner* — Angel Brockman
(74) *Attorney, Agent, or Firm* — Turk IP Law, LLC

(57) ABSTRACT

A method is provided for each router to individually manage retransmissions at run time in a single chip computer die or a single computer that includes cores or compute nodes and routers that interconnect the cores or the compute nodes. Each router compares static energy saving and dynamic energy increase from turning off a retransmission buffer of the router in a monitoring phase. When the static energy saving is greater than the dynamic energy increase, the router turns off the retransmission buffer in a subsequent monitoring phase. When the static energy saving is less than the dynamic energy increase, the router turns on the retransmission buffer in the subsequent monitoring phase.

33 Claims, 6 Drawing Sheets

(56) References Cited

U.S. PATENT DOCUMENTS

| | | | | |
|---|---|---|---|---|
| 2002/0150094 | A1* | 10/2002 | Cheng | H04L 12/185 370/389 |
| 2008/0163032 | A1* | 7/2008 | Lastras-Montano | G06F 11/1044 714/785 |
| 2010/0318822 | A1* | 12/2010 | Scandurra | G06F 1/3203 713/322 |
| 2015/0195836 | A1* | 7/2015 | Malkin | H04L 47/14 370/329 |

OTHER PUBLICATIONS

Chris Fallin et al., "MinBD: Minimally-Buffered Deflection Routing for Energy-Efficient Interconnect," 6th IEEE/ACM International Symposium on Networks on Chip, May 9-11, 2012, pp. 10.

Bo Fu, "Crosstalk-Aware Multiple Error Control for Reliable On-Chip Interconnects," National Science Foundation (NSF), 2010, pp. 214.

Phil May et al., "HiPER: A Compact Narrow Channel Router with Hop-by-Hop Error Correction," IEEE Transactions on Parallel and Distributed Systems, May 2012, pp. 485-498, vol. 13, No. 5.

Kresimir Mihic et al., "Reliability and Power Management of Integrated Systems," In Proceedings of the EUROMICRO System on Digital System Design(DSD '04), 2004, pp. 5-11, IEEE Computer Society, Washington, DC, USA.

Asit K. Mishra et al., "A Case for Dynamic Frequency Tuning in On-Chip Networks," In Proceedings of the 42nd Annual IEEE/ACM International Symposium on Microarchitecture (MICRO 42), Dec. 12-16, 2009, pp. 292-303, New York, NY, USA.

Thomas Moscibroda et al., "A Case for Bufferless Routing in On-Chip Networks," In Proceedings of the 36th annual international symposium on Computer architecture (ISCA '09), ACM, Jun. 20-24, 2009, pp. 196-207, Austin, Texas, USA.

Dongkook Park et al., "Exploring Fault—Tolerant Network-on-Chip Architectures," In Proceedings of the International Conference on Dependable Systems and Networks (DSN '06), 2006, pp. 93-104, IEEE Computer Society.

Saeed Shamshiri et al., "End-to-End Error Correction and Online Diagnosis for On-Chip Networks," International Test Conference, 2011, pp. 10, IEEE.

Lin Zhong et al., "Interconnect-aware Low Power High-level Synthesis," IEEE Transactions on Computer Aided Design of IC and Systems, Mar. 2005, pp. 336-351, vol. 24, No. 3.

* cited by examiner

OPERATIONS RELATED TO A RETRANSMISSION BUFFER

BACKGROUND

Field of the Invention

The present disclosure generally relates to reliable and energy efficient interconnects for single chip computer dies and microservers.

Description of the Related Art

Unless otherwise indicated herein, the approaches described in this section are not prior art to the claims in this application and are not admitted to be prior art by inclusion in this section.

A single chip computer (SCC) aggregates many cores within a single die. A microserver aggregates many compute nodes within a single machine. Both SCC and microserver have an interconnect to facilitate inter-core communication within a single chip or inter-node communication within a single machine.

Reliable interconnects are gaining importance as erroneous communication is manifesting more prominently with technology and operating voltage scaling trends. For example, near-threshold voltage (NTV) operations delay signal propagation and signal transition, which leads to higher error rates.

SUMMARY

In examples of the present disclosure, a method is provided for each router to individually manage retransmissions at run time in a single chip computer die or a single computer that includes cores or compute nodes and routers that interconnect the cores or the compute nodes. Each router compares static energy saving and dynamic energy increase from turning off a retransmission buffer of the router in a monitoring phase. When the static energy saving is greater than the dynamic energy increase, the router turns off the retransmission buffer in a subsequent monitoring phase. When the static energy saving is less than the dynamic energy increase, the router turns on the retransmission buffer in the subsequent monitoring phase.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are therefore not to be considered limiting of its scope, the disclosure will be described with additional specificity and detail through use of the accompanying drawings.

In the drawings.

DETAILED DESCRIPTION

Figure 1:
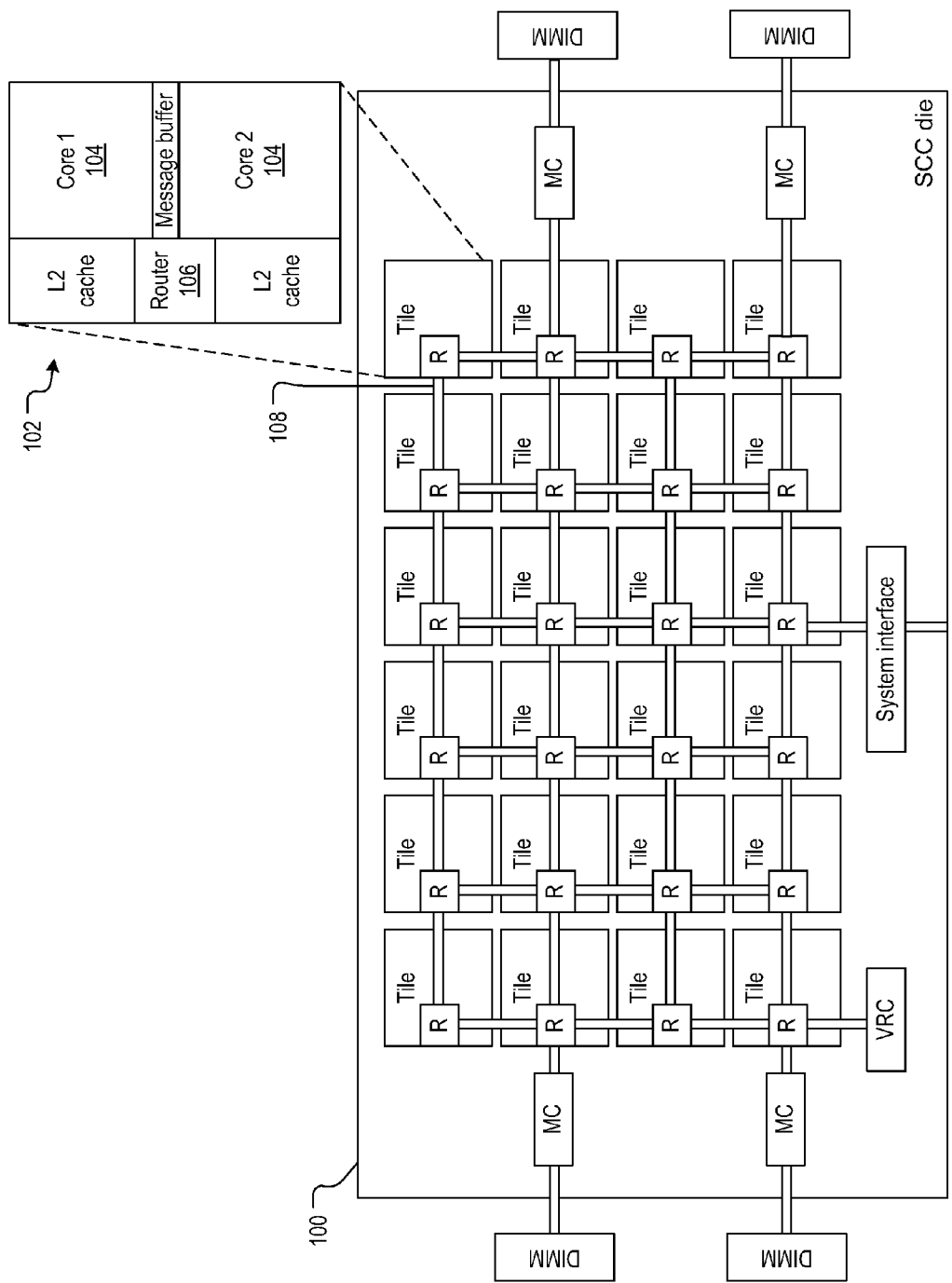
FIG. 1 is a block diagram of a single chip computer (SCC) die in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Interconnects are the backbones for inter-core and inter-node communications in computing systems. With technology and operating voltage scaling down, reliable interconnects are becoming essential. As the power becomes a precious resource in the dark silicon era, it is important to develop energy efficient interconnects.

Reliable interconnects may employ retransmission buffers along every hop to recover from faults, thus increasing the power demands of interconnects significantly. However, failure rates across interconnect components is not uniform. For example, it has been reported that faults increase exponentially with the temperature of a router. In a 2D mesh interconnect, routers in the middle experience higher utilization and thus higher temperature than routers in the corners. Further, interconnect congestion may be reduced by selectively reducing certain routers' voltage (and frequency). Having some routers operate in the near-threshold voltage (NTV) domain makes them more susceptible to faults than others.

Considering these factors, it is not necessary to keep retransmission buffers on at all time for all routers given that some routers do not experience high error rates. Hence turning off these retransmission buffers can save static power without impacting the fault recovery.

This disclosure is drawn, inter alia, to methods, apparatuses, computer programs, and systems related to dynamically turning off retransmission buffers associated with routers with low failure rates at run time. When a downstream router experiences a fault from such a router with its retransmission buffer turned off, the downstream router requests an end-to-end (E2E) retransmission from the source router instead of a hop-by-hop (HBH) retransmission from the upstream router. Overall energy is saved when the static energy saving from turning off the retransmission buffer is greater the dynamic energy increase from using E2E retransmissions. Furthermore, interconnect latency from using E2E retransmissions is similar to interconnect latencies from using HBH retransmissions and forward error correction (FEC) under low failure rates.

FIG. 1 is a block diagram of a single chip computer (SCC) die 100 in examples of the present disclosure. SCC die 100 includes tiles 102 (only one is labeled) that include multiple cores 104 (only two are shown), which are connected by routers 106 (only one is labeled) through a 2D mesh interconnect 108. Each router 106 has P input and P output ports, a crossbar, and a routing unit controlling the crossbar to selectively connect the input and the output ports. For example, each router has 4 input ports and 4 output ports for the 4 cardinal directions (north, east, south, and west), and 1 input port and 1 output port for the cores at the local tile.

The routing unit directs the flits (flow control units) of an incoming packet to the appropriate output port based on the packet's destination address in the header flit of the packet. A flit represents the minimum unit of data sent between two connected routers 106, and each packet includes a header flit, zero or more body flits, and a tail flit. Each port may include virtual channels, in which case a virtual channel allocator and a switch allocator may be provided to arbitrate among packets requesting the same virtual channel and arbitrate among virtual channels requesting access to the crossbar, respectively.

Figure 2:
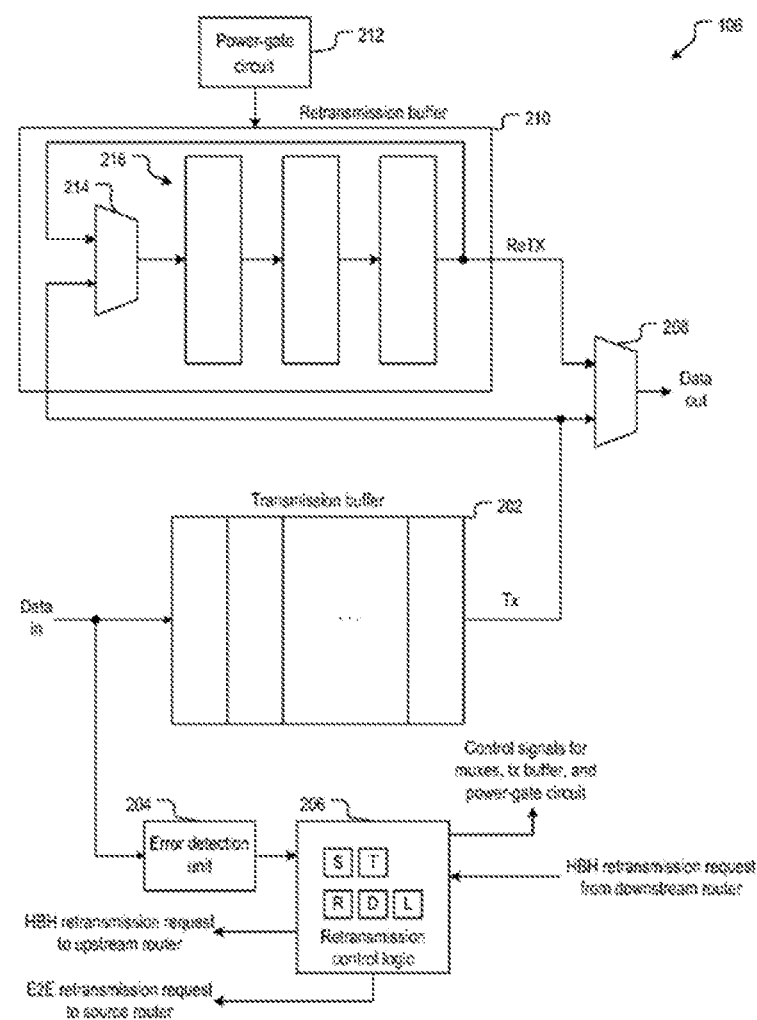
FIG. 2 is a block diagram illustrates components of a router in FIG. 1 involved in the retransmission of data in examples of the present disclosure.

FIG. 2 is a block diagram illustrates components of a router 106 (FIG. 1) involved in the retransmission of data in examples of the present disclosure. Router 106 includes a transmission buffer 202, an error detection unit 204, a retransmission control logic 206, an output multiplexer (mux) 208, a retransmission buffer 210, and a power-gate circuit 212. Transmission buffer 202 may be a first in, first out (FIFO) buffer. Retransmission control logic 206 may be implemented with an application specific integrated circuit (ASIC), a field-programmable gate array (FPGA), or a microcontroller. Retransmission buffer 210 may include an input mux 214 and a barrel-shift register 216.

Incoming flits are received at transmission buffer 202 and error detection unit 204. Transmission buffer 202 temporarily stores the flits to compensate for congestion, output link contention, and intra-router processing delays (e.g., routing computation). Transmission buffer 202 sequentially outputs the flits to output mux 208 and input mux 214. Output mux 208 provides the flits through the crossbar to an output port connected to the downstream router.

Input mux 214 provides the flits to barrel-shift register 216, which temporality stores the flits for retransmission. Barrel-shift register 216 sequentially outputs the flits to output mux 208 and input mux 214. The depth "N" of barrel-shift register 216 depends on the latency it takes for the downstream router to detect an uncorrectable error and signal back to the upstream router. An uncorrectable error is an error that can be detected but not corrected at router 106. For example, it may take 3 cycles for this round-trip communication—1 cycle to transmit the flit, 1 cycle to detect the uncorrectable error, and 1 cycle to send a HBH retransmission request to the upstream router. The HBH retransmission request may be in the form of a negative acknowledgement (NACK) from the downstream router. When retransmission control logic 206 receives the HBH retransmission request from the downstream router, it blocks transmission buffer 202 from transmitting for N cycles, causes output mux 208 to output N flits from barrel-shift register 216, and causes input mux 214 to input the N flits back into barrel-shift register 216 in case they needs to be retransmitted again.

Retransmission control logic 206 may track the number of HBH retransmission requests it receives from the downstream router in order to determine if the static energy saving is greater than the dynamic energy increase from turning off retransmission buffer 210. When retransmission control logic 206 determines the static energy saving is greater than the dynamic energy increase from turning off retransmission buffer 210, it turns off retransmission buffer 210 to conserve energy. Retransmission control logic 206 may turn off retransmission buffer 210 by power-gating (switching off the current) or clock-gating (switching off the clock). When retransmission control logic 206 turns off retransmission buffer 210, it may flag packets sent to the downstream router so the downstream router knows HBH retransmissions from the upstream router are not available.

Error detection unit 204 signals retransmission control logic 206 when an uncorrectable error is detected. Note that the header flit of a packet may be protected by FEC so source and destination addresses may be recovered if the header flit becomes corrupted, and error detection unit 204 may include a FEC circuit to recover the source and destination addresses.

When the packet including the flit with the uncorrectable error is flagged to indicate HBH retransmissions are not available from an upstream router, retransmission control logic 206 sends an E2E retransmission request to the source router. Retransmission control logic 206 may also send an H2B retransmission request (e.g., a NACK) to the upstream router to inform the upstream router of the uncorrectable error. As previously described, the number of H2B retransmission requests may be used by a router to determine if it should turn off its retransmission buffer.

Figure 3:
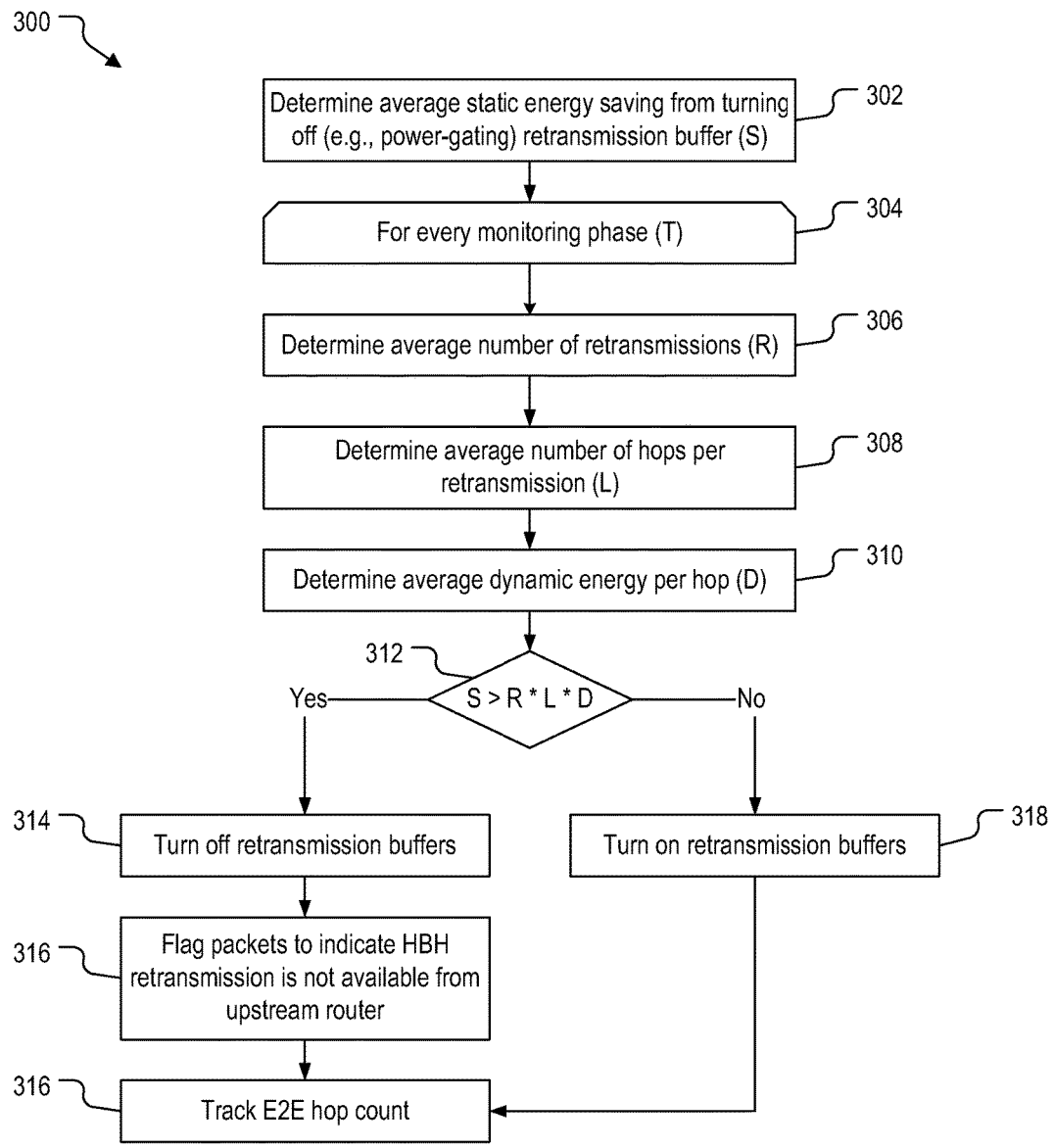
FIG. 3 is a block diagram of a method for a retransmission control logic in FIG. 2 to individually determine if it is to turn off a retransmission buffer in FIG. 2 at run time in examples of the present disclosure.

FIG. 3 is a block diagram of a method 300 for retransmission control logic 206 (FIG. 2) in each router 106 (FIG. 1) in SCC die 100 (FIG. 1) to individually determine if it is to turn off retransmission buffer 210 (FIG. 2) at run time in examples of the present disclosure. Method 300 may begin in block 302.

In block 302, retransmission control logic 206 determines a static energy saving "S" from turning off (e.g., power-gating) retransmission buffer 210. Static energy saving S is a design parameter that may not be impacted by run time conditions. Retransmission control logic 206 may determine static energy saving S by multiplying the amount of static energy saved per cycle times the number of cycles in a monitoring phase "T." Block 302 may be followed by block 304.

In block 304, retransmission control logic 206 starts a new monitoring phase. Block 304 may be followed by block 306.

In block 306, retransmission control logic 206 determines an average number of retransmissions "R." The average number of retransmissions R represents the average number of uncorrectable errors encountered between the local router and the downstream router. The average number of retransmissions R may be averaged over multiple monitoring phases. For example, retransmission control logic 206 tracks the number of HBH retransmission requests (e.g., NACK) received from the downstream router in the monitoring phase and averages that value with the values from a number of preceding monitoring phases.

Note that the downstream router sends HBH retransmission requests to the router even if the router has its retransmission buffer 210 turned off so that the router can track the number of retransmissions caused by uncorrectable errors. Block 306 may be followed by block 308.

In block 308, retransmission control logic 206 determines an average number of hops per retransmission "L." As retransmission control logic 206 is to compare static energy saving and dynamic energy increase when retransmission buffer 210 is turned off and E2E retransmissions are used, the number of hops per retransmission here refers to the number of hops for an E2E retransmission even if router 106 has retransmission buffer 210 turned on to send HBH retransmissions.

The average number of hops per retransmission L may be averaged over multiple monitoring phases. For example, retransmission control logic 206 tracks the number of hops per retransmission in the monitoring phase and averages that value with the values form a number of preceding monitoring phases. Retransmission control logic 206 may track the number of hops per retransmission in each monitoring phase by determining an E2E hop count for an incoming packet based on source and destination routers in the header flit, increments a running total with the E2E hop count when the downstream router sends a HBH retransmission request (e.g., a NACK), and dividing the running total by the number of HBH retransmission requests at the end of the monitoring phase. Block 308 may be followed by block 310.

In block 310, retransmission control logic 206 determines the average dynamic energy per hop "D." The average dynamic energy per hop D may be averaged over multiple monitoring phases. For example, the dynamic energy per hop in the monitoring phase may depend on various run time conditions including the paths taken, the delays experienced, the temperatures at the routers, the voltages of the routers, the currents of the routers, and the age of the routers. Block 310 may be followed by block 312.

In block 312, retransmission control logic 206 determines if the static energy saving S is greater than the dynamic energy increase, which is the product of R, L, and D, from turning off retransmission buffer 210. If so, block 312 may be followed by block 314. Otherwise block 312 may be followed by block 318.

In block 314, retransmission control logic 206 turns off retransmission buffer 210 (or maintains retransmission buffer 210 in an off state) in the next monitoring phase. Block 314 may be followed by block 316.

In block 316, retransmission control logic 206 flags outgoing packets to indicate HBH retransmissions are not available from the upstream router to the downstream router. For example, retransmission control logic 206 sets a bit in the header flit of the packet to indicate HBH retransmissions are not available from the upstream router to the downstream router. Block 316 may loop back to block 304 to determine again if the static energy saving S is greater than the dynamic energy increase (R*L*D) from turning off retransmission buffer 210 in the next monitoring phase.

In block 318, retransmission control logic 206 turns on retransmission buffer 210 (or maintains retransmission buffer 210 in an on state). Block 318 may loop back to block 304 to determine again if the static energy saving S is greater than the dynamic energy increase (R*L*D) from turning off retransmission buffer 210 in the next monitoring phase.

Figure 4:
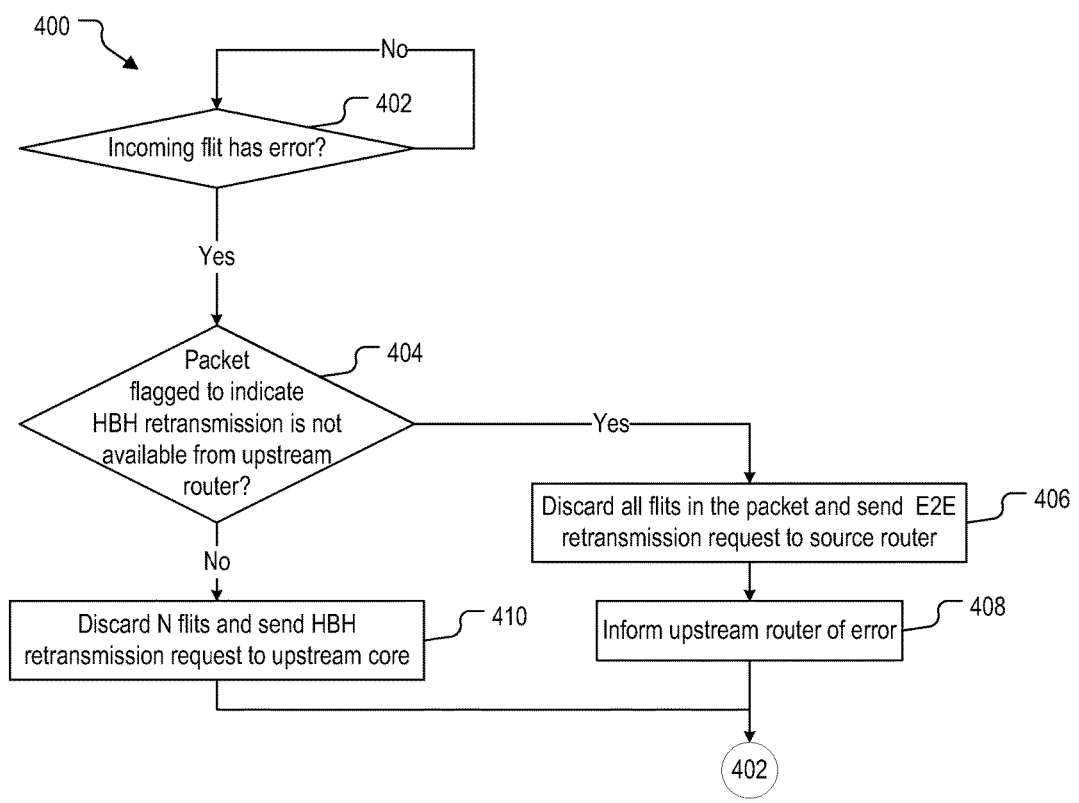
FIG. 4 is a block diagram of a method for the retransmission control logic in FIG. 2 to handle errors in incoming flits in examples of the present disclosure.

FIG. 4 is a block diagram of a method 400 for retransmission control logic 206 (FIG. 2) in each router 106 in SCC die 100 (FIG. 1) to handle uncorrectable errors in incoming flits in examples of the present disclosure. Method 400 may begin in block 402.

In block 402, retransmission control logic 206 determines if an incoming flit has any uncorrectable error. As previously described, error detection unit 204 signals retransmission control logic 206 when an incoming flit has an uncorrectable error. If an incoming flit does not have any uncorrectable error, block 402 may loop back to itself to process another incoming flit. Otherwise block 402 may be followed by block 404.

In block 404, retransmission control logic 206 determines if the packet including the flit has been flagged to indicate HBH retransmissions are not available from the upstream router. If so, block 404 may be followed by block 406. Otherwise block 404 may be followed by block 410.

In block 406, retransmission control logic 206 causes transmission buffer 202 to discard all flits in the packet and sends an E2E retransmission request for the packet to the source router. Alternatively, retransmission control logic 206 may cause transmission buffer 202 to discard the erroneous flit in the packet and send an E2E retransmission request for the flit. Block 406 may be followed by block 408.

In block 408, retransmission control logic 206 informs the upstream router of the detected error by sending a HBH retransmission request. Block 408 may be followed loop back to block 402 to process another incoming flit.

In block 410, retransmission control logic 206 discards N flits and sends a HBH retransmission request to the upstream router. Note that when the upstream router receives the HBH retransmission request, it is to retransmit the N flits in its retransmission buffer to the downstream router. Block 410 may be followed loop back to block 402 to process another incoming flit.

A system with routers that dynamically turn off retransmission buffers and request E2E retransmissions has been simulated to evaluate its benefits. The simulated system is a 64 core system where the cores are interconnected using 64 routers forming a 2D mesh. The cores communicate random traffic with an average injection rate of 0.02 packets/node/cycle, which is the average injection rate of applications in the Standard Performance Evaluation Corporation (SPEC) CPU2006 benchmark suite running with 32 KB L1 cache and 1 MB L2 cache. Each router in the simulated system has 5 output ports where each port has 8 buffers and 3 retransmission buffers per port. The simulated system is operated for 100,000 cycles. To simplify the evaluation, the routers in the simulated system turn off retransmission buffers and request E2E retransmissions when the error rate is less than 0.001. This is because HBH, E2E, and FEC have similar interconnect latency when error rate is less than 0.001.

The energy consumed in the simulated system includes three components: interconnect dynamic energy "d"+interconnect static energy "s"+retransmission buffer energy "r", which may be expressed as:

$$E\_base = d + s + r.$$

With an error rate of 0%, the energy consumed by the simulated system would be d+s since all the retransmission buffers are turned off (e.g., power gated), which may be expressed as:

If error=0, E_optimized=d+s, and $$\text{Energy savings} = 1 - (E\_optimized/E\_base) = 1 - (d+s/d+s+r)$$

where energy saving is achieved because r>0.

If error rate is greater than 0, the energy consumed by the simulated system would be d+s+E2E retransmission overhead "o", where:

$$E\_optimized = d+s+o, \text{ where } o = \text{number of errors} * \text{AvgRetransmitLatencyInHops} * \text{AvgDynamicEnergyPerHop},$$

and $$\text{Energy savings} = 1 - (E\_optimized/E\_base) = 1 - (d+s+o/d+s+r),$$

where energy saving is achieved when o<r.

Assume the simulated system returns the following values:

s=0.8 mJ,
d=0.5 mJ,
r=0.29 mJ,
AvgDynamicEnergyPerHop=0.0005 mJ, and
AvgRetransmitLatencInHops=6 hops.

For an error rate of 0% (number of uncorrectable errors=0), energy savings=18.3%.

For an error rate of 0.00001 (number of uncorrectable errors=1), energy savings=18%.

For an error rate of 0.0001 (number of uncorrectable errors=10), energy savings=16.3%.

For an error rate of 0.001 (number of uncorrectable errors=100), energy savings=0%.

Thus turning off retransmission buffers and requesting E2E retransmissions, the simulated system reduces the total interconnect energy by up to 18.3% assuming 3 retransmission buffers for every port of 8 transmission buffers. If the number of retransmission buffer is larger, or the number of buffers per output port is lower, the energy savings will be higher. For example, if the number of buffers in the output port is reduced from 8 to 4, the energy savings would become 31.5%, 31%, 30%, 15% for 0%, 0.00001, 0.0001, and 0.001 error rates, respectively. If the interconnect contributes to 25% of the whole-chip power consumption, then the energy savings can reach up to 8% of the chip power.

Figure 5:
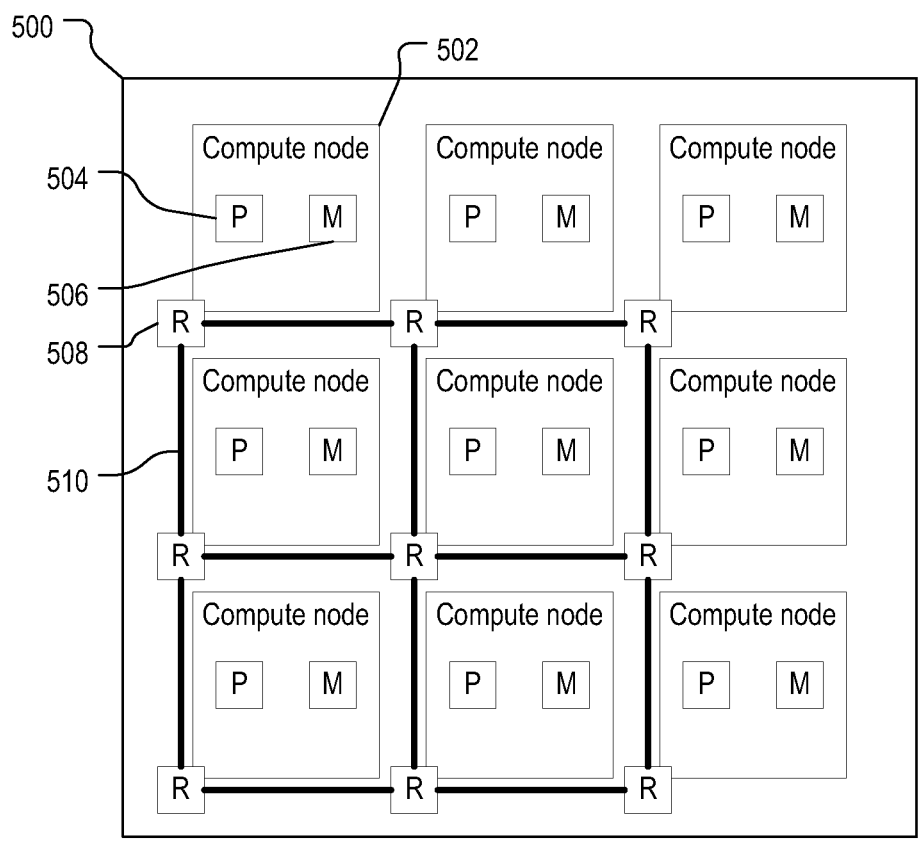
FIG. 5 is a block diagram of a microserver in examples of the present disclosure.

FIG. 5 is a block diagram of a microserver 500 die in examples of the present disclosure. Microserver 500 is a single computer that includes compute nodes 502 (only one is labeled) that include processors 504 and main memory 506, which are connected by routers 508 (only one is labeled) through an interconnect 510. Each router 508 may be implemented similarly as router 106 (FIG. 1) to perform methods 300 (FIG. 3) and 400 (FIG. 4) to turn off retransmission buffers and handle communication errors. Thus the functionalities of router 508 are not repeated.

In addition to SCCs and microservers, any chip with a large number of cores or nodes connected through an interconnect may benefit from the approach of the present disclosure.

Figure 6:
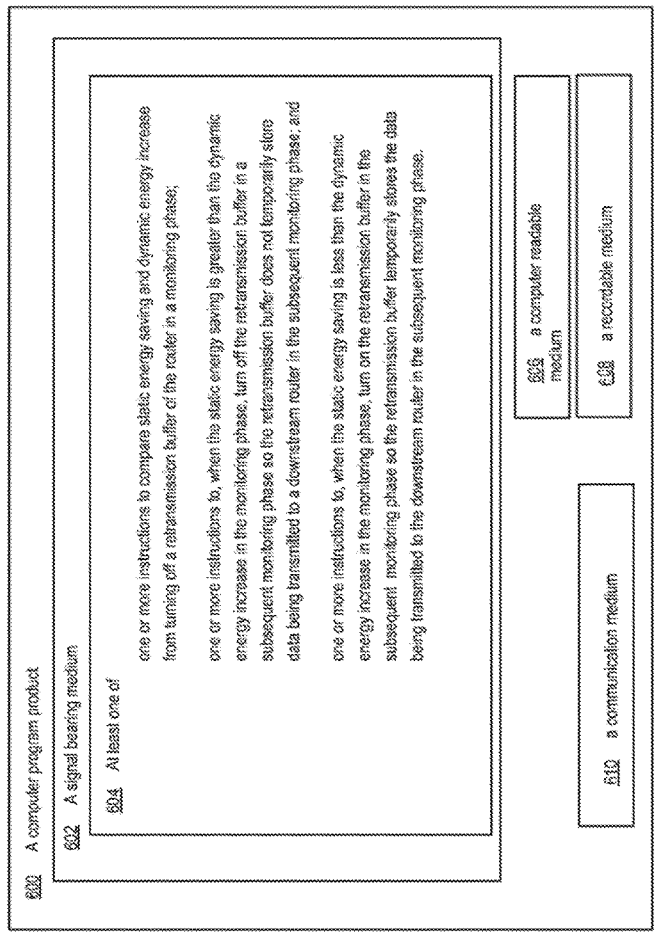
FIG. 6 is a block diagram of an illustrative embodiment of a computer program product to implement a method to individually turn off retransmission buffers in examples of the present disclosure.

FIG. 6 is a block diagram of an illustrative embodiment of a computer program product 600 to implement a method to individually turn off retransmission buffers in examples of the present disclosure. Computer program product 600 may include a signal bearing medium 602. Signal bearing medium 602 may include one or more sets of executable instructions 604 stored thereon that, in response to execution by, for example, a processor, may provide the features and operations described above. For example, referring to FIG. 2, retransmission control logic 206 may undertake one or more of the operations shown in FIGS. 3 and 4 in response to the instructions 604.

In some implementations, signal bearing medium 602 may encompass a non-transitory computer readable medium 606, such as, but not limited to, a hard disk drive HDD, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communication medium 610, such as, but not limited to, a digital and/or an analog communication medium (e.g., a fiber optic cable, a waveguide, a wired communication link, a wireless communication link, etc.). Thus, for example, referring to FIG. 2, computer program product 600 may be wirelessly conveyed to the retransmission control logic 206 by signal bearing medium 602, where signal bearing medium 602 is conveyed by communication medium 610 (e.g., a wireless communications medium conforming with the IEEE 802.11 standard). Computer program product 600 may be recorded on non-transitory computer readable medium 606 or another similar recordable medium 608.

The use of hardware or software may be generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In some embodiments, a method of managing power consumption in a router, for example a router of a networked system, comprises determining a static energy saving from power gating a retransmission buffer in the router. Operation of the retransmission buffer consumes energy, and the energy saving from power gating (e.g. turning off) the retransmission buffer may be termed a static energy saving. However, an error rate for data transmission may increase when the retransmission buffer is power-gated, leading to a dynamic energy increase e.g. for using an end-to-end retransmission scheme at the router for loss recovery. By comparing the static energy saving and the dynamic energy increase, a retransmission controller (also termed a retransmission control logic) may be used to lower the total energy consumption. For example, when the error rate is relatively low even when the retransmission buffer is power gated, most or substantially all of the static energy saving may be realized. Alternatively, if the error rate is higher, such that the static energy saving is significantly offset by e.g. the end-to-end retransmission scheme used to reduce loss, the retransmission buffer may be not power gated (e.g. may be turned on or otherwise placed in an operational state). Monitoring phases may be used at intervals to determine whether there is an energy saving when the retransmission buffer is power gated.

In some embodiments, powering the retransmission buffer and disabling the end-to-end retransmission scheme further comprises using a hop-by-hop retransmission scheme at the router for loss recovery. Other methods of loss recovery may be used.

In some embodiments, error rates may change with operating temperature, age, transmission bandwidth, and other parameters, and a computer system may self-diagnose to determine an operational mode (e.g. for each router of a plurality of routers) that reduces energy use. A computer system may operate in two modes, a first mode including power gating the retransmission buffer and using an end-to-end retransmission scheme (or other retransmission scheme) for loss recovery e.g. when errors are detected at a downstream router, or a second mode including powering the retransmission buffer and disabling the end-to-end retransmission scheme. The operational mode may be selected at intervals, for example by comparing static energy saving and dynamic energy increase associated with power gating the retransmission buffer at intervals, for example using one or more monitoring phases. A comparison may also be triggered by an appreciable change in error rate, in either operational mode.

In some embodiments, the router is operated in a first mode for a first monitoring time, with the retransmission buffer power gated, and optionally operated in a second mode for a second monitoring time while using the retransmission buffer. In some examples, energy usage and optionally first and second error rates may be compared in the first and second modes, respectively. The router may then be operated in first or second modes with retransmission buffer off or on respectively, for a time interval, followed by further monitoring phases.

In some embodiments, some or all routers of a computer system may include a retransmission buffer that may be power gated based on a comparison of static energy saving and dynamic energy increase associated with power gating the retransmission buffer. The comparison may be made at intervals for each router having a retransmission buffer, but the comparison (e.g. using monitoring times) need not be simultaneous for all routers.

In some embodiments, a computer system comprises a plurality of nodes and/or cores, and a plurality of routers, and one or more routers of the plurality of routers comprises a transmission buffer; a retransmission buffer; and a power gate circuit configured to turn off the retransmission buffer. The power gate circuit may be controlled by a retransmission controller configured to compare a static energy saving from turning off the retransmission buffer with a dynamic energy increase from using an end-to-end retransmission scheme, and when the static energy saving is greater than the dynamic energy increase in the monitoring phase, turn off the retransmission buffer; and when the static energy saving is less than the dynamic energy increase in the monitoring phase, turn on the retransmission buffer. In some examples, a look up table may be used, for example to determine the static energy saving per cycle for power gating the retransmission buffer. The plurality of nodes and/or cores may be interconnected in a network using the plurality of routers.

In some examples, a retransmission controller associated with a router is configured to determine and compare the static energy saving and dynamic energy increase, for example during monitoring phases or otherwise during operation of the computer system, associated with power gating the retransmission buffer. In some examples, the comparison (and, for example, monitoring phases) may occur at predetermined times, such as at intervals, or when significant changes in error rate are detected, or if significant changes in ambient conditions (e.g. temperature) are detected.

In some embodiments, a computer system may gain a useful reduction in power consumed by data interconnections. In some embodiments, the computer system may be a near threshold voltage computer (NTV) system. By power-gating one or more retransmission buffers, static power consumption may be appreciably reduced. In some computer systems, routers may have different error rates depending on operating conditions, and power gating of the retransmission buffers having lower error rates may be used to reduce total energy consumption. An error check unit at a receive end sends a signal to the router (the sender), and the data may then be retransmitted. As long as error rates are relatively low, the dynamic energy increase due to retransmission is more than compensated for by the static energy savings. In some examples, the supply voltage may also be adjusted, allowing further optimization of power consumption. For example, lowering the supply voltage may increase error rates, making static power saving unavailable. However, increasing the supply voltage may increase power consumption while not significantly lowering error rates. A supply voltage may be used such a first group of routers in the network each have an associated retransmission buffer power gated, whereas a second (e.g. higher error rate) group of routers each use an associated retransmission buffer. The relative numbers in each group may vary during operation of the computer system.

In some embodiments, a computer system run time may be partitioned into one or more monitoring phases, during which the average number of retransmissions, the average retransmission latency, and the average (e.g. end-to-end) dynamic energy used by a router may be determined. Static power saved by power gating is compared with the power used by e.g. end to end retransmission and the comparison is used to determine if the retransmission buffer is power gated in a subsequent run time period. A power gated retransmission buffer may be turned back on e.g. after a predetermined period (e.g. during a subsequent monitoring phase), or if an error rate exceed a threshold value. A control signal can be generated during run time based on an error detection rate. In some examples, a retransmission buffer in use may be power gated if a determined error rate falls below a second threshold value. In some examples, a hysteresis may be introduced to avoid excessive state changes of the retransmission buffer, for example the second threshold error rate below which the retransmission buffer is power gated may be lower than the threshold error rate above which the retransmission buffer is powered on. A similar hysteresis approach may be introduced to the energy comparison, for example a power gated retransmission buffer may remain power gated until the dynamic energy cost exceeds the static energy saving added to a small hysteresis factor (to reduce the frequency of state changes of the retransmission buffer).

In some embodiments, the static energy saving from power gating the retransmission buffer may have a different relationship to the supply voltage than the dynamic energy cost of retransmission. At some supply voltages, retransmission may tend to cost less energy than that saved by power gating the retransmission buffers. A computer system having a variable supply voltage may cease monitoring as described herein and operate with the retransmission buffers on, and not power gated. However, in some examples a computer system may always or occasionally operate with a lower supply voltage, for example when an external power supply is not present. For example, a computer system may perform the energy comparisons described herein (to determine which retransmission buffers it may be beneficial to power gate) only when in an energy saving mode (for example, when using internal battery power only, or in a designated energy conservation mode).

In some embodiments, a method of managing power consumption (for example, lowering an average power consumption) of a router having an associated retransmission buffer comprises determining a first energy usage in a first mode, the first mode comprising data transmission with the retransmission buffer power gated (e.g. turned off) and end-to-end retransmission used for error correction, determining a second energy usage in a second mode, the second mode comprising operating the router with the retransmission buffer on (and, for example, using hop by hop error correction), and subsequently selecting the operating mode of the router as the first mode or second mode, according to which mode has the lower energy usage.

In some embodiments, a method of managing power consumption (for example, lowering an average power consumption) of a router having an associated retransmission buffer comprises determining a power saving due to power gating the retransmission buffer. Further (optionally in a monitoring phase) the power cost is determined by determining the average number of end to end retransmissions needed for error correction, determining the average end-to-end retransmission latency in terms of a number of hops, and determining an average energy per hop. If the power saving of power gating the retransmission buffer exceeds the dynamic power increase due to the end-to-end retransmissions, the retransmission buffer may be power gated. Analogously, if the retransmission buffer is off, and a monitoring phase determines that the static power saving of power gating the retransmission buffer is less than the dynamic power increase due to the end-to-end retransmissions, the retransmission buffer may be turned on. If the retransmission buffer is on, end-to-end retransmission for errors (e.g. a dropped packet) may be halted.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via ASICs, FPGAs, digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated at least in part by the following claims.

We claim:

1. A method for each router to individually manage retransmissions at run time in a single chip computer die or a single computer that includes cores or compute nodes and routers that interconnect the cores or the compute nodes, the method comprising:
    comparing static energy saving and dynamic energy increase from turning off a retransmission buffer of the router in a monitoring phase, wherein the dynamic energy increase comprises a product of an average number of transmissions requested by a downstream router, an average number of hops per retransmission, and an average dynamic energy per hop;
    when the static energy saving is greater than the dynamic energy increase in the monitoring phase, turning off the retransmission buffer in a subsequent monitoring phase so that being transmitted to the downstream router in the subsequent monitoring phase is not temporarily stored in the retransmission buffer; and
    when the static energy saving is less than the dynamic energy increase in the monitoring phase: turning on the retransmission buffer in the subsequent monitoring phase, and
    temporarily storing, in the retransmission buffer, the data that is transmitted to the downstream router in the subsequent monitoring phase.

2. The method of claim 1, wherein:
    the average number of transmissions requested by the downstream router is averaged over multiple monitoring phases including the monitoring phase;
    the average number of hops per retransmission is averaged over the multiple monitoring phases including the monitoring phase; and
    the average dynamic energy per hop is averaged over the multiple monitoring phases including the monitoring phase.

3. The method of claim 1, wherein each retransmission comprises an end-to-end retransmission from a source router to a destination router and a hop count for each retransmission comprises a number of hops from the source router to the destination router.

4. The method of claim 1, wherein the average dynamic energy per hop in the monitoring phase depends on paths taken, delays experienced, temperatures at the routers, voltages of the routers, currents of the routers, or ages of the routers.

5. The method of claim 1, further comprising, when the retransmission buffer is turned off:
    determining whether incoming data has an uncorrectable error; and
    when the incoming data has the uncorrectable error, flagging the incoming data to indicate that a hop-by-hop retransmission is not available from an upstream router to the downstream router.

6. The method of claim 1, further comprising:
    determining whether incoming data has an uncorrectable error;
    when the incoming data has the uncorrectable error, recording a hop count for an end-to-end retransmission of the incoming data;
    when the downstream router signals the uncorrectable error in the incoming data, adding the hop count to a running total; and
    at an end of the monitoring phase, determining a number of hops per retransmission in the monitoring phase from the running total and a number of the uncorrectable error signals by the downstream router.

7. The method of claim 1, further comprising:
    determining whether incoming data has an uncorrectable error;
    when the incoming data has the uncorrectable error, determining whether the incoming data is flagged to indicate that a hop-by-hop retransmission is not available from an upstream router to the downstream router;
    when the incoming data is not flagged, requesting the hop-by-hop retransmission from the upstream router to the downstream router; and
    when the incoming data is flagged, discarding the incoming data and requesting an end-to-end retransmission from a source router.

8. The method of claim 7, further comprising, when the incoming data is flagged, signaling the upstream router that the incoming data has the uncorrectable error.

9. A non-transitory computer-readable storage medium, including a set of computer-readable instructions stored thereon which, in response to execution by a retransmission control logic, cause the retransmission control logic to perform the method of any of claims 1-8.

10. A single chip computer die or a single computer, comprising:
    cores or compute nodes; and
    routers that interconnects the cores or the compute nodes, each router comprising:
        a transmission buffer to a downstream router;
        an error detection unit;
        a retransmission buffer to the downstream router;
        a power gate circuit to turn off the retransmission buffer; and
        a retransmission control logic for:

comparing static energy saving and dynamic energy increase from turning off the retransmission buffer of the router in a monitoring phase, wherein the dynamic energy increase comprises a product of an average number of transmissions requested by the downstream router, an average number of hops per retransmission, and an average dynamic energy per hop;

when the static energy saving is greater than the dynamic energy increase in the monitoring phase, turning off the retransmission buffer in a subsequent monitoring phase so the retransmission buffer does not temporarily store data that is transmitted to the downstream router in the subsequent monitoring phase; and when the static energy saving is less than the dynamic energy increase in the monitoring phase, turning on the retransmission buffer in the subsequent monitoring phase so the retransmission buffer temporarily stores the data that is transmitted to the downstream router in the subsequent monitoring phase.

11. The single chip computer die or the single computer of claim 10, wherein:
the average number of transmissions requested by the downstream router is averaged over multiple monitoring phases including the monitoring phase;
the average number of hops per retransmission is averaged over the multiple monitoring phases including the monitoring phase; and
the average dynamic energy per hop is averaged over the multiple monitoring phases including the monitoring phase.

12. The single chip computer die or the single computer of claim 10, wherein each retransmission comprises an end-to-end retransmission from a source router to a destination router and a hop count for each retransmission comprises a number of hops from the source router to the destination router.

13. The single chip computer die or the single computer of claim 10, wherein the average dynamic energy per hop in the monitoring phase depends on paths taken, delays experienced, temperatures at the routers, voltages of the routers, currents of the routers, or ages of the routers.

14. The single chip computer die or the single computer of claim 10, wherein the retransmission control logic, when the retransmission buffer is turned off:
determines whether incoming data has an uncorrectable error; and
when the incoming data has the uncorrectable error, flags the incoming data to indicate that a hop-by-hop retransmission is not available from an upstream router to the downstream router.

15. The single chip computer die or the single computer of claim 10, wherein the retransmission control logic:
determines whether incoming data has an uncorrectable error;
when the incoming data has the uncorrectable error, records a hop count for an end-to-end retransmission of the data;
when the downstream router signals the uncorrectable error in the incoming data, adds the hop count to a running total; and
at an end of the monitoring phase, determines a number of hops per retransmission in the monitoring phase from the running total and a number of the uncorrectable error signals by the downstream router.

16. The single chip computer die or the single computer of claim 10, wherein the retransmission control logic:
determines whether incoming data has an uncorrectable error;
when the incoming data has the uncorrectable error, determines whether the incoming data is flagged to indicate that a hop-by-hop retransmission is not available from an upstream router to the downstream router;
when the incoming data is not flagged, requests the hop-by-hop retransmission from the upstream router to the downstream router; and
when the incoming data is flagged, discards the incoming data and request an end-to-end retransmission from a source router.

17. The single chip computer die or the single computer of claim 16, wherein the retransmission control logic, when the incoming data is flagged, signals the upstream router that the incoming data has the uncorrectable error.

18. A method of managing power consumption in a router of a network system, the router having a retransmission buffer, the method comprising:
determining a static energy saving from power gating the retransmission buffer;
determining a dynamic energy increase from using an end-to-end retransmission scheme at the router when the retransmission buffer is power gated;
comparing the static energy saving and the dynamic energy increase, wherein the determination of the static energy saving comprises multiplication of a static energy saving per cycle by a number of cycles when the retransmission buffer is power gated;
power gating the retransmission buffer and using the end-to-end retransmission scheme when the static energy saving exceeds the dynamic energy increase; and
powering the retransmission buffer when the dynamic energy increase exceeds the static energy saving.

19. The method of claim 18, wherein powering the retransmission buffer comprises disabling the end-to-end retransmission scheme and using a hop-by-hop retransmission scheme.

20. The method of claim 18, wherein determining the dynamic energy increase includes determining a number of end-to-end retransmissions, and determining the dynamic energy increase using the number of end-to-end retransmissions and an average energy per end-to-end retransmission.

21. The method of claim 18, further comprising: operating the router in a monitoring mode for a monitoring time, the retransmission buffer being power gated and the router using the end-to-end retransmission for error correction during a monitoring phase;
determining a number of retransmissions during the monitoring phase;
determining an average end-to-end latency as a number of hops during the monitoring phase; and
determining the dynamic energy increase from the number of retransmissions, the average end-to-end latency as the number of hops, and an average energy per hop.

22. The method of claim 21, further comprising operating the router in the monitoring mode at intervals.

23. The method of claim 18, further comprising:
operating the router in a first mode, wherein the retransmission buffer is power gated when the router is in the first mode;
determining a first error rate when the router is in the first mode; and ending the power gating of the retransmission buffer when the first error rate exceeds a first threshold value.

24. The method of claim 23, further comprising:
operating the router in a second mode, wherein the retransmission buffer is operational when the router is in the second mode;
determining a second error rate when the router is in the second mode; and
power gating the retransmission buffer when the second error rate is less than a second threshold value.

25. A computer system comprising a plurality of routers, at least one router of the plurality of routers comprising:
a transmission buffer;
an error detection unit;
a retransmission buffer;
a power gate circuit to turn off the retransmission buffer; and
a retransmission controller configured to:
compare a static energy saving from turning off the retransmission buffer of the at least one router in a monitoring phase with a dynamic energy increase from using an end-to-end retransmission scheme, wherein the dynamic energy increase comprises a product of an average number of transmissions requested by a downstream router, an average number of hops per retransmission, and an average dynamic energy per hop;
when the static energy saving is greater than the dynamic energy increase in the monitoring phase, turn off the retransmission buffer; and
when the static energy saving is less than the dynamic energy increase in the monitoring phase, turn on the retransmission buffer.

26. The computer system of claim 25, wherein the retransmission controller is configured to determine the dynamic energy increase during the monitoring phase, and wherein the monitoring phase being performed at intervals.

27. The computer system of claim 25, further comprising a single chip computer.

28. The computer system of claim 25, further comprising a multicore processor.

29. The computer system of claim 25, further comprising a plurality of networked compute nodes.

30. The computer system of claim 25, wherein the error detection unit is configured to receives an error signal from the downstream router when there is an uncorrectable error in data transmission to the downstream router.

31. A router comprising:
a transmission buffer;
an error detection unit;
a retransmission buffer;
a power gate circuit operable to turn off the retransmission buffer; and
a retransmission controller configured to:
compare a static energy saving from turning off the retransmission buffer of the router in a monitoring phase with a dynamic energy increase from using an end-to-end retransmission scheme, wherein the dynamic energy increase comprises a product of an average number of transmissions requested by a downstream router, an average number of hops per retransmission, and an average dynamic energy per hop;
when the static energy saving is greater than the dynamic energy increase in the monitoring phase, turn off the retransmission buffer; and
when the static energy saving is less than the dynamic energy increase in the monitoring phase, turn on the retransmission buffer.

32. The router of claim 31, wherein the router is associated with a core of a multicore processor.

33. The router of claim 31, wherein the router is associated with a compute node of a computer system, wherein the computer system includes a plurality of compute nodes including the compute node.

* * * * *

UNITED STATES PATENT AND TRADEMARK OFFICE
CERTIFICATE OF CORRECTION

PATENT NO. : 9,766,681 B2
APPLICATION NO. : 14/306406
DATED : September 19, 2017
INVENTOR(S) : Solihin et al.

It is certified that error appears in the above-identified patent and that said Letters Patent is hereby corrected as shown below:

In the Claims

In Column 13, Line 51, in Claim 1, delete "that being" and insert -- that data being --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*